United States Patent
Regunathan et al.

(10) Patent No.: US 10,911,826 B1
(45) Date of Patent: Feb. 2, 2021

(54) DETERMINING APPROPRIATE VIDEO ENCODINGS FOR VIDEO STREAMS

(71) Applicant: Facebook, Inc., Menlo Park, CA (US)

(72) Inventors: Shankar Lakshmi Regunathan, Redmond, WA (US); Minchuan Chen, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/155,767

(22) Filed: Oct. 9, 2018

Related U.S. Application Data

(60) Provisional application No. 62/570,000, filed on Oct. 9, 2017.

(51) Int. Cl.
| | | |
|---|---|---|
| *H04N 21/462* | (2011.01) | |
| *H04N 21/2365* | (2011.01) | |
| *H04N 21/238* | (2011.01) | |

(52) U.S. Cl.
CPC ....... *H04N 21/4621* (2013.01); *H04N 21/238* (2013.01); *H04N 21/23655* (2013.01)

(58) Field of Classification Search
CPC ......... H04N 21/4621; H04N 21/23655; H04N 21/238; H04N 19/12; H04N 19/154; H04N 7/465; H04N 19/103; H04N 19/40; H04N 21/23439; H04L 47/801; H04L 65/4084; H04L 65/80
See application file for complete search history.

(56) References Cited

U.S. PATENT DOCUMENTS

| | | | | |
|---|---|---|---|---|
| 8,718,145 | B1* | 5/2014 | Wang | H04N 19/12 |
| | | | | 375/240.02 |
| 9,723,266 | B1* | 8/2017 | Hu | H04N 21/23418 |
| 10,178,043 | B1* | 1/2019 | Ganjam | H04L 65/4084 |
| 2012/0236930 | A1* | 9/2012 | Gavade | H04N 21/44209 |
| | | | | 375/240.02 |
| 2013/0083203 | A1* | 4/2013 | Barrett | H04L 43/0829 |
| | | | | 348/180 |
| 2016/0173944 | A1* | 6/2016 | Kilar | H04N 21/458 |
| | | | | 725/12 |
| 2017/0374432 | A1* | 12/2017 | Adzic | H04N 21/23418 |
| 2018/0205778 | A1* | 7/2018 | Forman | H04L 65/607 |
| 2018/0302660 | A1* | 10/2018 | Olechowski | H04L 65/602 |

* cited by examiner

*Primary Examiner* — Muhammad Raza
(74) *Attorney, Agent, or Firm* — Jordan IP Law, LLC

(57) ABSTRACT

In one embodiment, a method includes receiving, from an uploading client system, a video; calculating an overall quality score for one or more encodings for the video, wherein the overall quality score of a respective encoding is based on a playback-quality score, the playback-quality score being based on a video quality or bit rate of the respective encoding; receiving, from a requesting client system, a request for the video and information associated with the request, wherein the information associated with the request comprises information about the requesting client system; determining, for the requesting client system, a first encoding based on the overall quality score of the encoding and the information associated with the request; and sending, to the requesting client system, the first encoding for display.

20 Claims, 6 Drawing Sheets

DETERMINING APPROPRIATE VIDEO ENCODINGS FOR VIDEO STREAMS

PRIORITY

This application claims the benefit, under 35 U.S.C. § 119(e), of U.S. Provisional Patent Application No. 62/570,000, filed 9 Oct. 2017, which is incorporated herein by reference.

TECHNICAL FIELD

This disclosure generally relates to optimizing video distribution on a network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

As video streaming becomes increasingly popular, with millions if not billions of streams being delivered to users every day on video platforms, the task of determining the optimum video encodings to serve to users is becoming increasingly difficult. Users access video streams on a wide array of display devices, with, for example, phones of all sizes, tablets, TVs, laptops, and desktops. What further complicates the task is the ever-increasing variety of ways that users consume video content. For example, users might view a video within a newsfeed of an online social network, within the body of a private message, within a text messaging thread on a phone, within a picture-in-picture display of a video chat, full-screen in landscape mode, or full-screen in portrait mode, to name just a few ways. Further adding to the complexity are the differences in the network bandwidth available to each user requesting a video. Even within a single view session, this may change, for example, as a user walks out of range of a WIFI router and connects to a cellular data network. Each combination of factors such as the ones listed above may have a single (or very few) appropriate (or optimal) video encodings. Not delivering these appropriate video encodings may result in a poor user experience, and may discourage users from accessing video content. For example, if a high-resolution encoding is delivered to a client system when it has low network bandwidth, the video playback may stall often and result in user frustration. The disclosed method attempts to solve this problem by dynamically considering relevant factors to calculate scores tied to video quality that may be used to determine what encodings are appropriate for a particular situation.

In particular embodiments, a server computing machine may receive, from an uploading client system, a video. The server computing machine may calculate an overall quality score for one or more encodings for the video. In particular embodiments, the overall quality score of an encoding may be based on a playback-quality score. The playback-quality score may be a measure of the preserved quality between the original video and the encoding. The playback-quality score may be based on a video quality (e.g., a resolution of the video) and/or a bit rate of the original video (which may be measured by the computing server machine) as compared to a video quality and/or a bit rate of the encoding. In particular embodiments, the overall quality score of an encoding may be based on an upload-quality score, which may be a quality measurement of the video as originally received from the uploading client system. The server computing machine may receive, from a requesting client system, a request for the video, along with suitable information associated with the request (e.g., information about the device type/model, network bandwidth). The server computing machine may determine, for the requesting client system, a first encoding. The first encoding may be determined based on the overall quality score of the encoding and the information associated with the request. The server computing machine may send, to the requesting client system, the first encoding for display.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
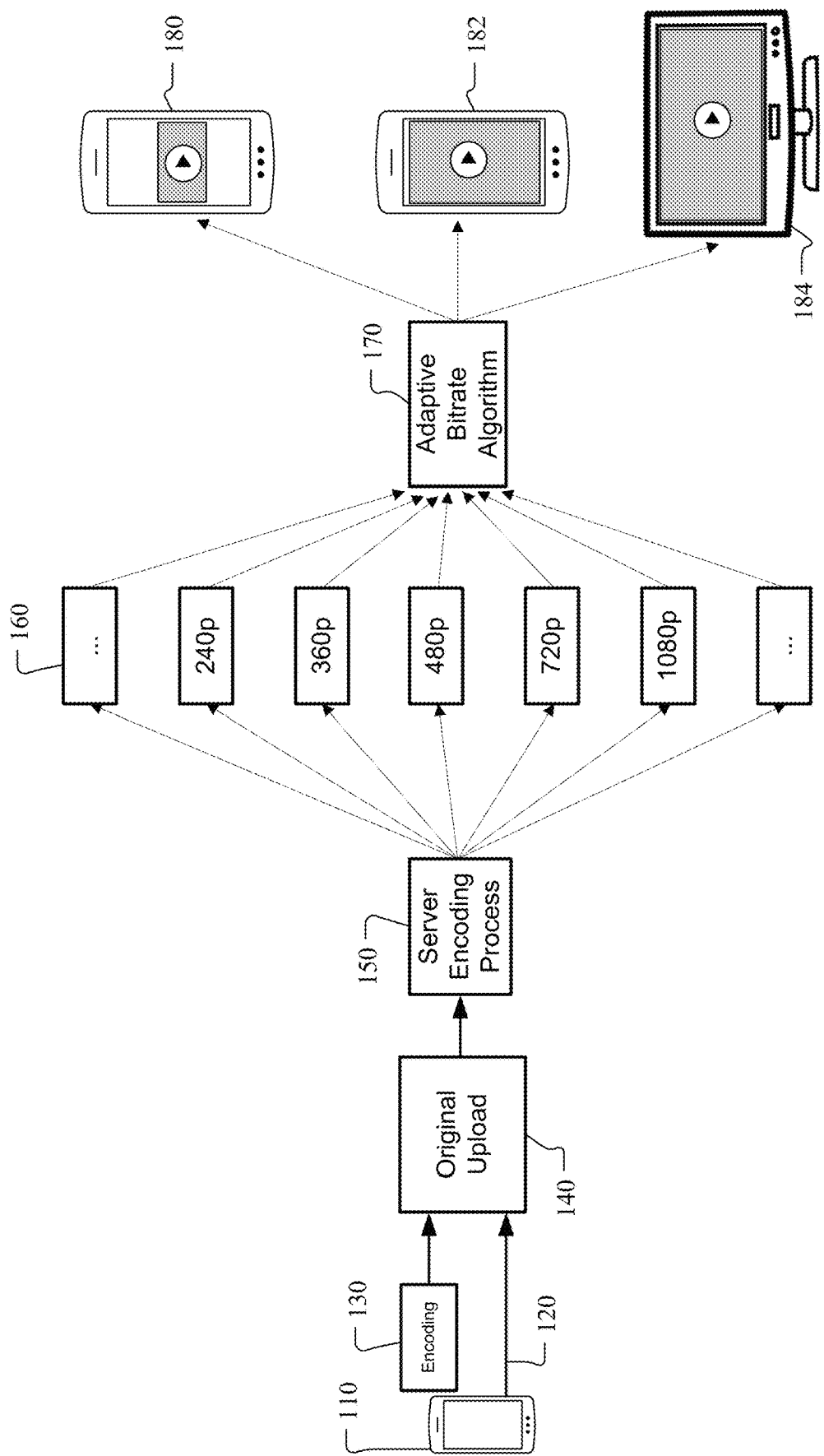
FIG. 1 illustrates an example process for receiving a video, generating encodings for the video, and delivering different encodings to different requesting client systems.

As video streaming becomes increasingly popular, with millions if not billions of streams being delivered to users every day on video platforms, the task of determining the optimum video encodings to serve to users is becoming increasingly difficult. Users access video streams on a wide array of display devices, with, for example, phones of all sizes, tablets, TVs, laptops, and desktops. What further complicates the task is the ever-increasing variety of ways that users consume video content. For example, users might view a video within a newsfeed of an online social network, within the body of a private message, within a text messaging thread on a phone, within a picture-in-picture display of a video chat, full-screen in landscape mode, or full-screen in portrait mode, to name just a few ways. Further adding to the complexity are the differences in the network bandwidth available to each user requesting a video. Even within a single view session, this may change, for example, as a user walks out of range of a WIFI router and connects to a cellular data network. Each combination of factors such as the ones listed above may have a single (or very few) appropriate (or optimal) video encodings. Not delivering these appropriate video encodings may result in a poor user experience, and may discourage users from accessing video content. For example, if a high-resolution encoding is delivered to a client system when it has low network bandwidth, the video playback may stall often and result in user frustration. The disclosed method attempts to solve this problem by dynamically considering relevant factors to calculate scores tied to video quality that may be used to determine what encodings are appropriate for a particular situation.

In particular embodiments, a server computing machine may receive, from an uploading client system, a video. The server computing machine may calculate an overall quality score for one or more encodings for the video. In particular embodiments, the overall quality score of an encoding may be based on a playback-quality score. The playback-quality score may be a measure of the preserved quality between the original video and the encoding. The playback-quality score may be based on a video quality (e.g., a resolution of the video) and/or a bit rate of the original video (which may be measured by the computing server machine) as compared to a video quality and/or a bit rate of the encoding. In particular embodiments, the overall quality score of an encoding may be based on an upload-quality score, which may be a quality measurement of the video as originally received from the uploading client system. The server computing machine may receive, from a requesting client system, a request for the video, along with suitable information associated with the request (e.g., information about the device type/model, network bandwidth). The server computing machine may determine, for the requesting client system, a first encoding. The first encoding may be determined based on the overall quality score of the encoding and the information associated with the request. The server computing machine may send, to the requesting client system, the first encoding for display.

FIG. 1 illustrates an example process for receiving a video, generating encodings for the video, and delivering different encodings to different requesting client systems. In particular embodiments, a server computing machine may receive, from an uploading client system, a video. As an example and not by way of limitation, an uploading client system (e.g., the mobile device 110) may upload a video to a server computing machine of a social networking system (e.g., the social-networking system 460). The video may be of any suitable content type. As examples and not by way of limitation, the video may be a slide show, an animation, or a natural video. In particular embodiments, referencing FIG. 1, the uploading client system may send the video to the server computing machine in a raw format as illustrated by the arrow 120. Alternatively, again referencing FIG. 1, the uploading client system may first transcode the video (e.g., by compressing the video) and the resulting encoding 130 may be sent to the server computing machine. In particular embodiments, the server computing machine may receive, and may optionally store, this video in its original form (e.g., the original uploaded video 140). Although this disclosure focuses on videos, it contemplates any suitable media items (e.g., audio files, interactive media).

In particular embodiments, the server computing machine may generate one or more encodings for the video. As an example and not by way of limitation, referencing FIG. 1, the server computing machine may initiate the server encoding process 150, which may generate several encodings for an uploaded video (e.g., the encodings 160 for different resolutions).

Figure 2:
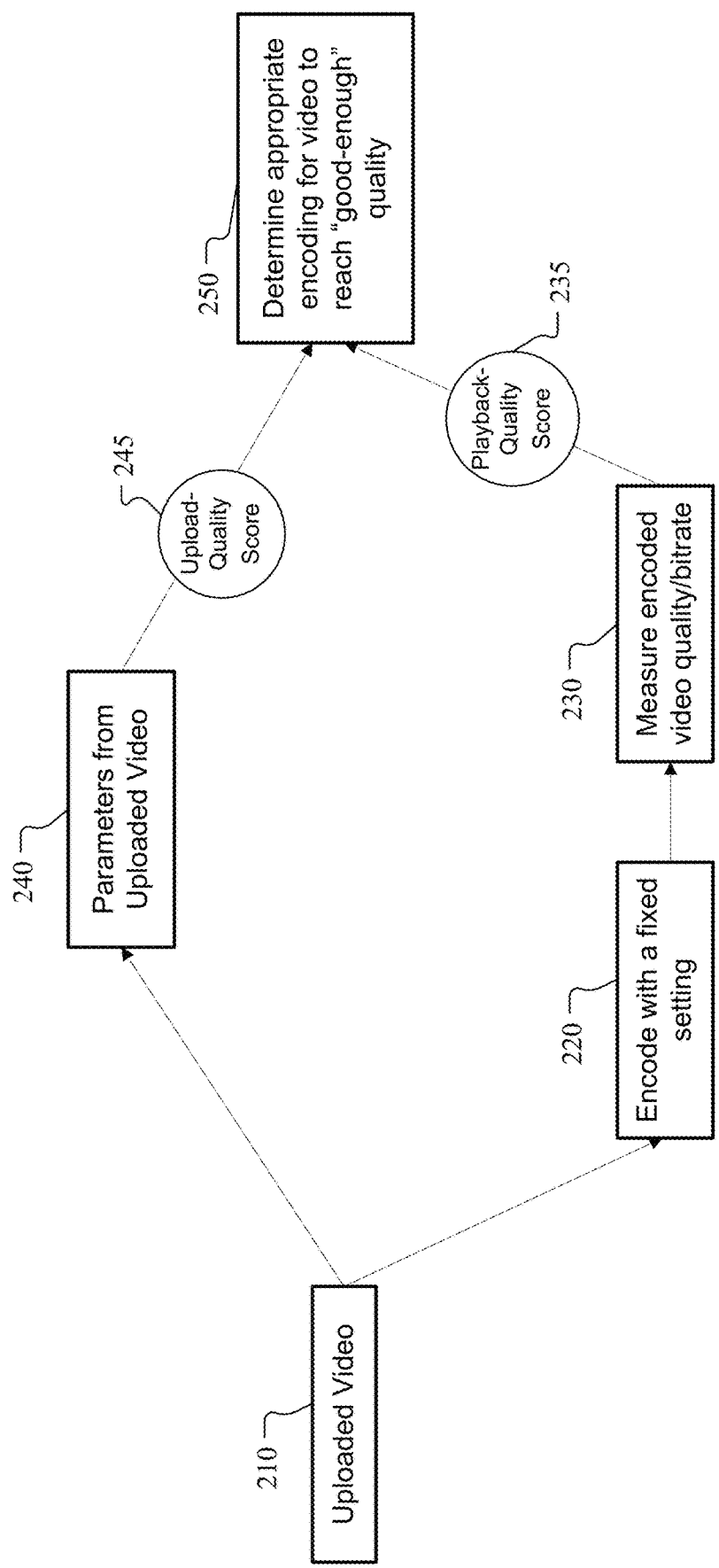
FIG. 2 illustrates an example process for determining appropriate encoding settings for a video stream.

FIG. 2 illustrates an example process for determining appropriate encoding settings for a video stream. In particular embodiments, the server computing machine may calculate an overall quality score for one or more encodings for the video. In particular embodiments, the overall quality score of an encoding may be based on an upload-quality score. The upload-quality score may be a quality measurement of the video as originally received from the uploading client system. In particular embodiments, the upload-quality score may be calculated based on one or more parameters associated with the original uploaded video. As an example and not by way of limitation, referencing FIG. 2, the server computing machine may use the parameters 240, which may include a bit rate of the original uploaded video 210, a resolution of the original uploaded video 210, or any other suitable parameters that may define the quality of the original uploaded video 210, to calculate the upload quality score 245. In particular embodiments, the upload-quality score may be calculated based on a no-reference metric.

In particular embodiments, the overall quality score of an encoding may be based on a playback-quality score. In particular embodiments, the playback-quality score may be a measure of the quality that is preserved from the original video in the encoding. In particular embodiments, the playback-quality score of an encoding may be based on a video quality (e.g., a resolution of the video) or bit rate of the respective encoding. In particular embodiments, the playback-quality score of an encoding may be based on a comparison of video quality and/or a bit rate of the original video (which may be measured by the computing server machine) with respect to a video quality and/or a bit rate of the encoding. In particular embodiments, the playback-quality score (e.g., the playback-quality score 235 in FIG. 2) of an encoding may be measured by generating an encoding (e.g., as illustrated by the step 220 in FIG. 2), and then measuring parameters of the encoding (e.g., the video quality and/or bit rate of the encoding, as illustrated by the step 230 in FIG. 2. In particular embodiments, the playback-quality score may be calculated based on a full-reference metric such as MS-SSIM (Multiscale Structural Similarity).

In particular embodiments, the full-reference metric may be mapped onto a perceptually linear score such as a MOS-correlated score.

In particular embodiments, the overall quality score (or just the upload-quality score or the playback-quality score) may be based on a content type of the video (e.g., slide show, animation, natural video). As an example and not by way of limitation, a 480p encoding of a slide-show video may receive a higher overall quality score than a 480p encoding of a natural video, because, for example, the 480p resolution may be "good enough" for a slide show but not good enough for a natural video (e.g., for which users may expect higher resolutions). In particular embodiments, some video content may reach the "good-enough" quality at a higher CRF than others, and this may be based on the video content's relative complexity.

In particular embodiments, the server computing machine may receive, from a requesting client system, a request for the video. The server computing machine may also receive suitable information associated with the request. As an example and not by way of limitation, the information associated with the request may include information about the requesting client system. For example, the information may include information about a screen size, a device type/model (e.g., referencing FIG. 1, information specifying that the device may be a mobile device 180 from a particular manufacturer, a television 184, etc.), client system resources (e.g., available RAM, clock speed, video card, CPU/GPU information). As another example and not by way of limitation, the information associated with the request may include information about a network bandwidth available to the requesting client system. In particular embodiments, the information associated with the request may include an indication of a requested view mode. As an example and not by way of limitation, the requesting client system may be requesting the video for playback in full-screen mode (see, for example, the display of the requesting client system 182 illustrated in FIG. 1). As another example and not by way of limitation, the requesting client system may be requesting the video for playback in sub-full-screen mode, where the video is to be played back within a small subsection of the display of the client system (see, for example, the subsection of the display of the requesting client system 180 illustrated in FIG. 1). This may include the case where the video is played back on the requesting client system within a newsfeed of an online social network. As another example and not by way of limitation, the requesting client system may be requesting the video for playback in landscape mode or portrait mode.

In particular embodiments, the server computing machine may determine, for the requesting client system, a first encoding. In particular embodiments, the determination may be performed by an algorithm that may determine what encoding to send to a requesting client system. As an example and not by way of limitation, referencing FIG. 1, the server computing machine may use an adaptive bit rate algorithm (e.g., adaptive bit rate algorithm 170) that adapts to a context provided by the uploaded video (e.g., content type, original quality) and the information associated with the requesting client system (e.g., device type, available network bandwidth). In particular embodiments, the first encoding may be determined based on the overall quality score of the encoding and the information associated with the request. In particular embodiments, the server computing machine may determine an encoding with the highest overall quality score that may be appropriate based on the information associated with the request. In particular embodiments, an encoding may be deemed appropriate if it reaches a threshold overall quality score that is "good enough" for the requesting client system (e.g., as illustrated by the step 250 in FIG. 2). As an example and not by way of limitation, the server computing machine may determine that a 240p resolution encoding is appropriate for a wearable headset device because it may be good enough for the resolutions supported by the wearable headset device. As another example and not by way of limitation, the server computing machine may determine that a 480p resolution encoding is good enough for a laptop that is having limited bandwidth. In particular embodiments, the adaptive bit rate algorithm may determine an optimum encoding by adjusting the bit rate of an encoding for a given resolution. As an example and not by way of limitation, given a fixed resolution, it may increase a bit rate to improve quality at that resolution.

Given the large number of videos that are uploaded and streamed every day, it is often prohibitively complex and expensive to calculate overall quality scores for every possible encoding whenever a requesting client system requests a video in an "online" process (i.e., following request of the video by the requesting client system). In particular embodiments, the server computing machine may calculate overall quality scores for one or more encodings of a video in an "offline" process (e.g., sometime after the video is uploaded, but before the video is requested). This may cut down on processing time when a requesting client system requests a video, because the calculations (e.g., of overall quality scores for the available encoding) required to determine an appropriate encoding would have already been performed, in which case the server computing machine may quickly send an appropriate encoding without further delay. In particular embodiments, the server computing machine may calculate overall quality scores for only a subset of available encodings, and may interpolate scores to determine an appropriate encoding to send to a requesting client system. As an example and not by way of limitation, a server computing machine may determine overall quality scores for a 240p resolution and a 480p resolution, and may simply approximate an overall quality score for a 360p resolution. By limiting the number of encodings for which overall quality scores are calculated, the server computing machine may save a significant amount of time and computing resources in the aggregate (given the large number of videos that are uploaded and streamed every day).

In particular embodiments, the server computing machine may send, to the requesting client system, the first encoding for display. As an example and not by way of limitation, referencing FIG. 1, the 1080p encoding of the original uploaded video 140 may be sent to a requesting client system (e.g., the television 184).

In particular embodiments, the server computing machine may access view-time information for determining a quality of playback of the first encoding. In particular embodiments, the view-time information may include information about a download rate associated with the requesting client system. The download rate may be a measure of a rate at which the first encoding is being downloaded by the requesting client system. The download rate may be used by the server computing machine to, for example, ensure that video playback is not stalling for lack of bandwidth (or to at least minimize such stalling). In particular embodiments, view-time information may be received from the requesting client system. As an example and not by way of limitation, the view-time information may include a measure of the quality of the video as an encoding of it is being rendered on the client system (e.g., the exact playback resolution and played encoding information), which may be different from a predicted model that may have been used to calculate an overall quality score for the encoding. In particular embodiments, the view-time information may be used to update an overall quality score for an encoding.

In particular embodiments, different durations of a video may have different appropriate encodings. As an example and not by way of limitation, a portion of a video that is just a slide show presentation that is mostly solid color may only need a low-resolution encoding to be "good enough," while a portion of the same video that has natural video may require a higher resolution. In particular embodiments, the adaptive bit rate algorithm may account for this, adjust quality scores, and send encodings to requesting client systems accordingly.

In particular embodiments, view-time information may account for changes in playback, and may provide a feedback loop for determining the appropriate encoding to send. In particular embodiments, the computing server machine may determine, based on view-time information, a second encoding (e.g., one that may be more appropriate, as determined by view-time information), and may send, to the requesting client system, the second encoding in place of the first encoding. The requesting client system may then transition to playback of the second encoding. This may happen repeatedly in response to view-time information. This feedback process may fine-tune and optimize the delivery of the video the requesting client system. In particular embodiments, a new encoding may be warranted based on view-time information indicating changed conditions for the requesting client system, which may happen in the same session (e.g., as the video is being played). As an example and not by way of limitation, view-time information may indicate that the client system has reduced bandwidth availability (e.g., the requesting client system may have transitioned from a relatively fast wireless connection to a relatively slow cellular data connection), and may send view-time information that indicates this reduced bandwidth availability. In this example, the server computing device may determine that a second encoding with a lower resolution (e.g., 480p) may be more suitable than a first encoding (e.g., 720p) that was being sent before, and may send data configured to render the second encoding in place of data configured to render the first encoding. As another example and not by way of limitation, view-time information may indicate that a user has switched a view mode by switching from a sub-full-screen mode (e.g., where the video is played back within a newsfeed of an online social network) to a full-screen mode.

In particular embodiments, view-time information may be used to measure average quality scores of encodings as they are being viewed. As an example and not by way of limitation, the server computing machine may determine a first overall quality score for a 720p encoding as a user watches a first portion of a video on full-screen mode, and then may determine a second overall quality score for a 360p encoding as a user switches to a sub-full-screen mode during a second portion of the video. In this example, the server computing machine may average out the scores to determine an averaged score (e.g., a weighted average score, weighted based on duration of the portions).

Figure 3:
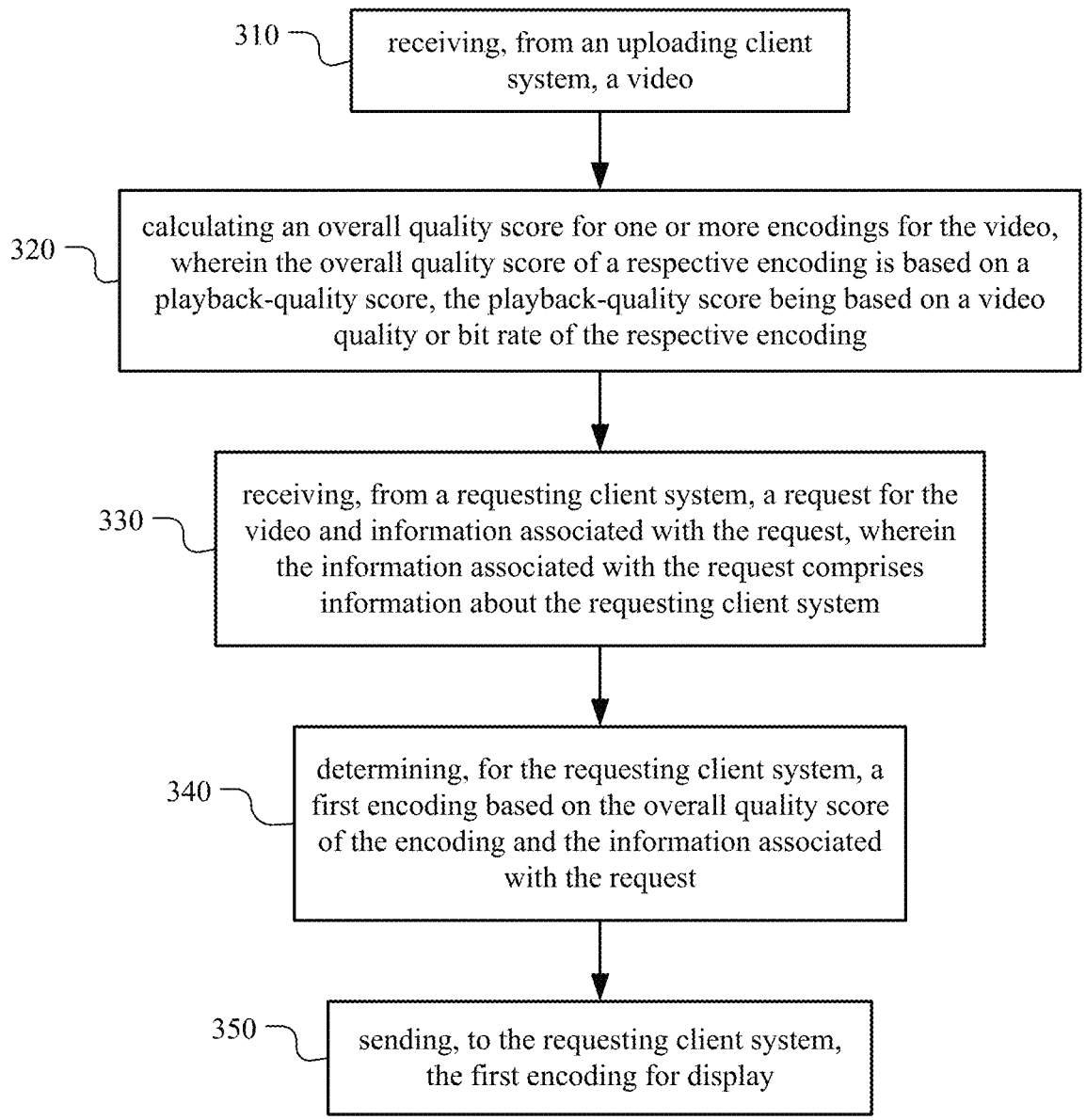
FIG. 3 illustrates an example method for determining and sending encodings for a video.

FIG. 3 illustrates an example method 300 for determining and sending encodings for a video. The method may begin at step 310, where a server computing machine may receive, from an uploading client system, a video. At step 320, the server computing machine may calculate an overall quality score for one or more encodings for the video, wherein the overall quality score of a respective encoding is based on a playback-quality score, the playback-quality score being based on a video quality or bit rate of the respective encoding. At step 330, the server computing machine may receive, from a requesting client system, a request for the video and information associated with the request, wherein the information associated with the request comprises information about the requesting client system. At step 340, the server computing machine may determine, for the requesting client system, a first encoding based on the overall quality score of the encoding and the information associated with the request. At step 340, the server computing machine may send, to the requesting client system, the first encoding for display. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining and sending encodings for a video including the particular steps of the method of FIG. 3, this disclosure contemplates any suitable method for determining and sending encodings for a video including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

System Overview

Figure 4:
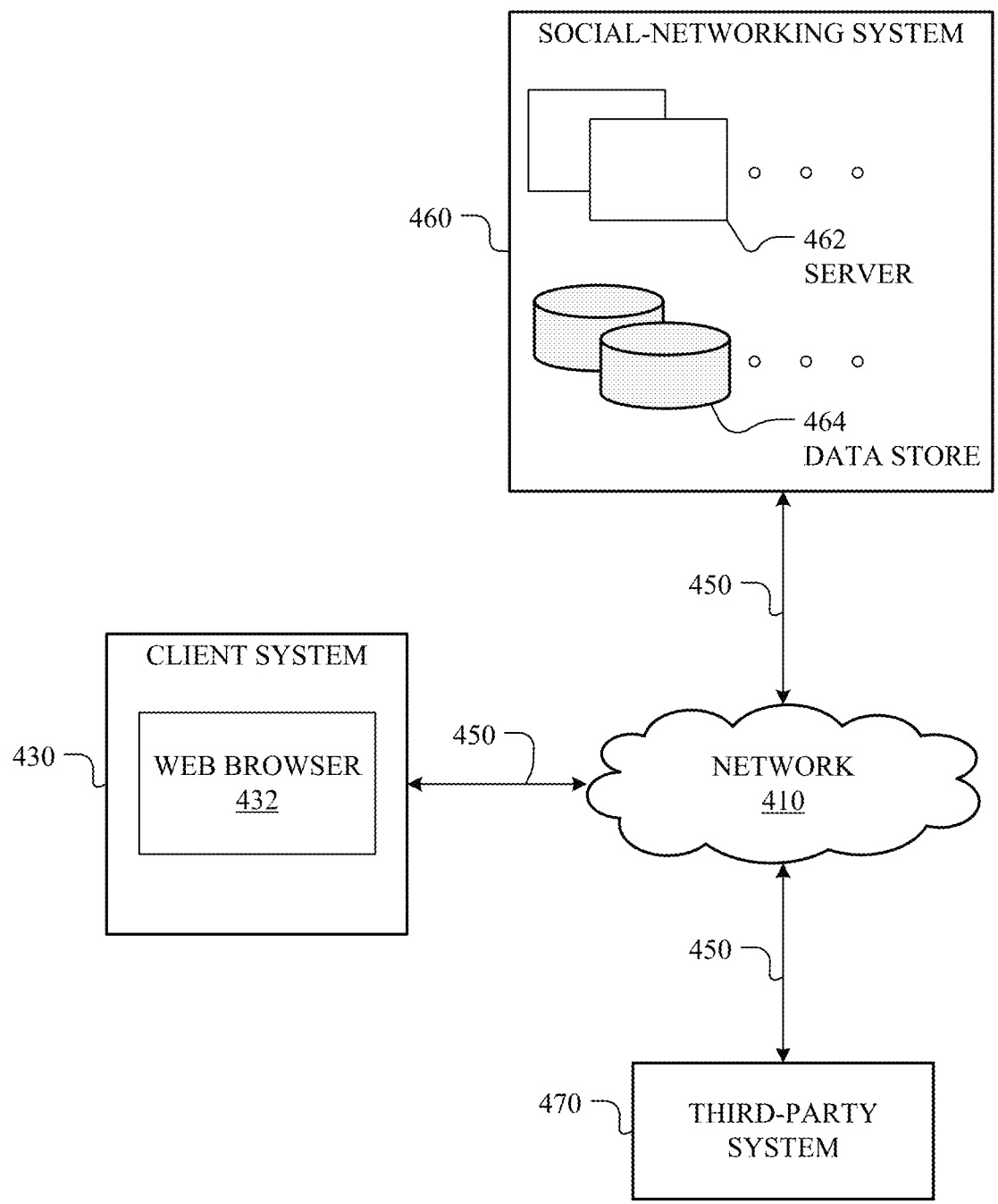
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Social Graphs

Figure 5:
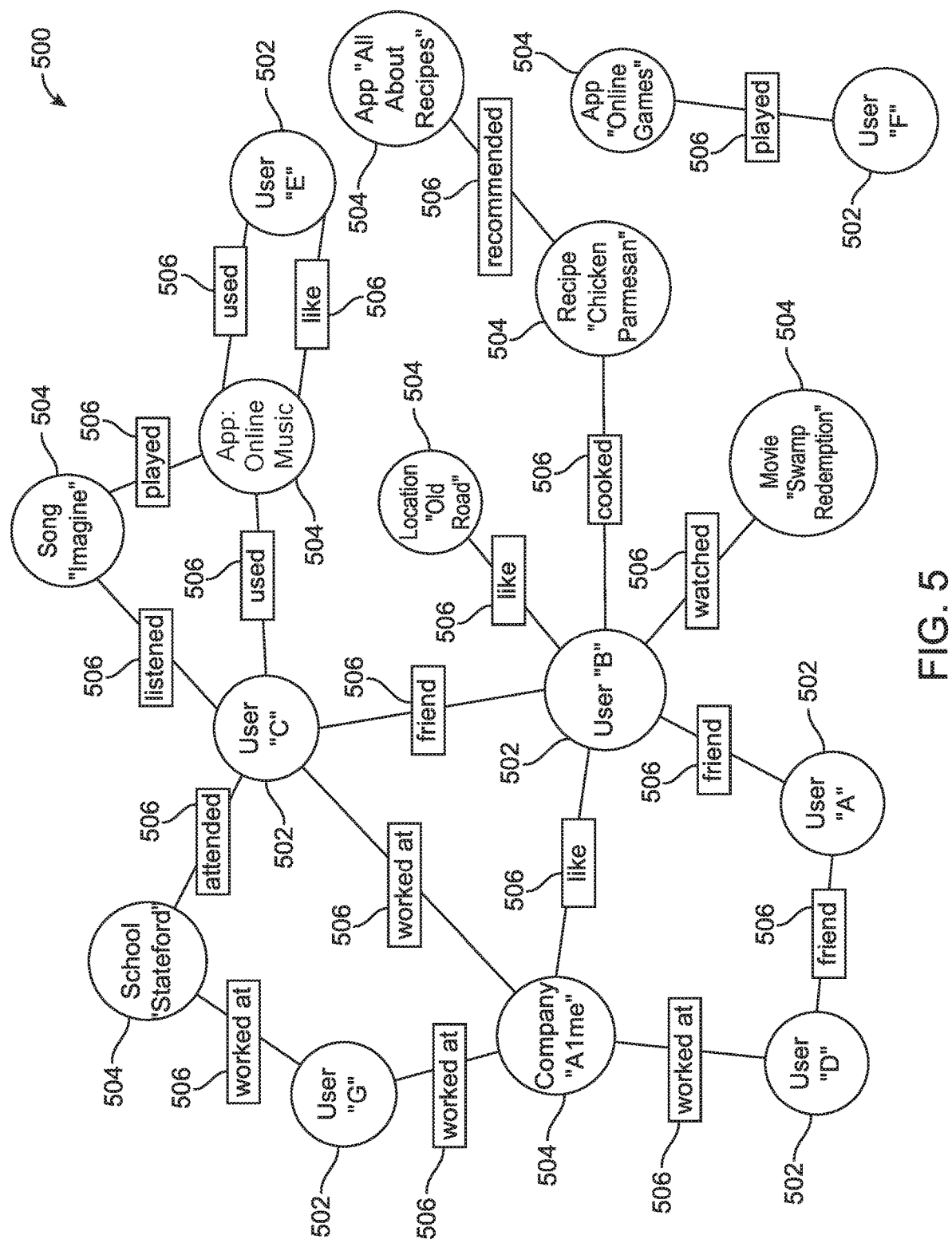
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Each node may be associated with a unique entity (i.e., user or concept), each of which may have a unique identifier (ID), such as a unique number or username. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more data stores 464. In the example of FIG. 5, social graph 500 includes an edge 506 indicating a friend relation between user nodes 502 of user "A" and user "B" and an edge indicating a friend relation between user nodes 502 of user "C" and user "B."

Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "Acme" and the user node 502 of user "D," and a third path passing through the user nodes 502 and concept nodes 504 representing school "Stanford," user "G," company "Acme," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504.

Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504).

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Social Graph Affinity and Coefficient

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 504 corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 470). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 470, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 460 may send a request to the data store 464 for the object. The request may identify the user associated with the request and may only be sent to the user (or a client system 430 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
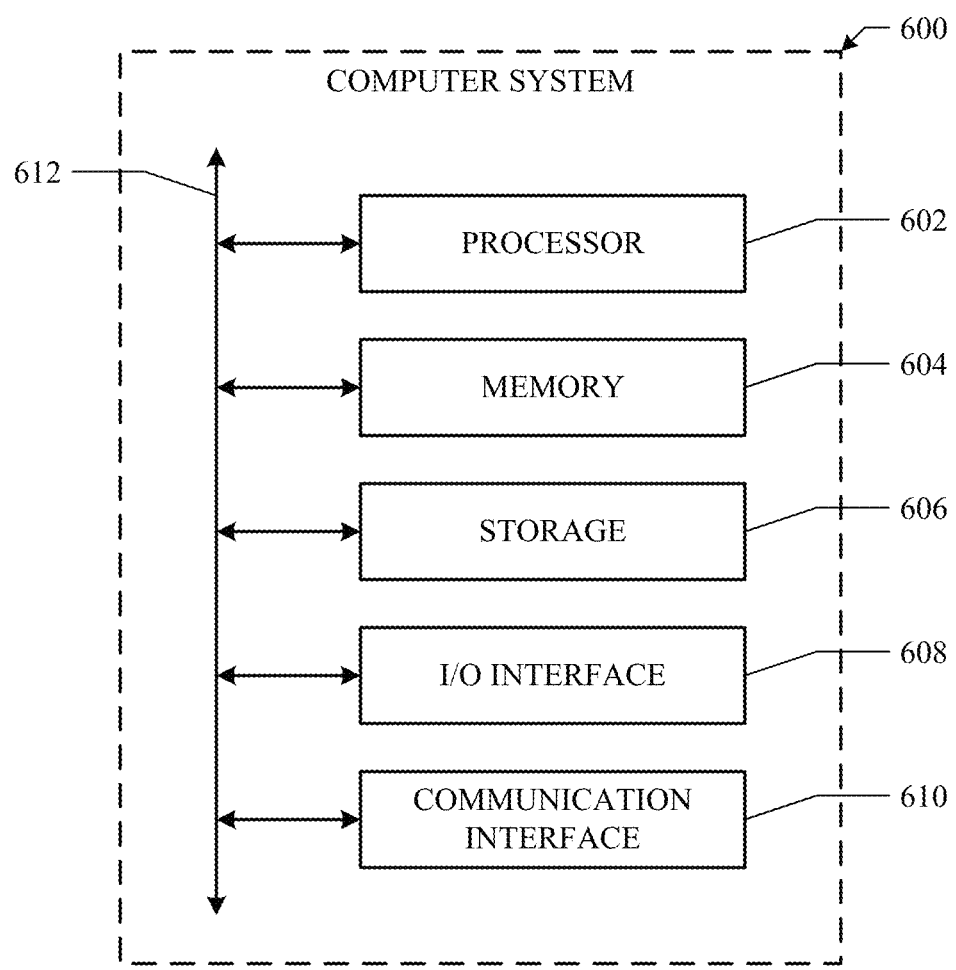
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a server computing machine:
receiving, from an uploading client system, a video;
calculating an overall quality score for one or more encodings for the video, wherein the overall quality score of a respective encoding is based on a playback-quality score and an upload quality score, the playback-quality score being based on a video quality or bit rate of the respective encoding and the upload-quality score being a quality measurement of the video as received;
calculating the upload-quality score based on one or more parameters associated with the video as received from the uploading client system, wherein the one or more parameters comprises a bit rate or a resolution of the video;
receiving, from a requesting client system, a request for the video and information associated with the request, wherein the information associated with the request comprises information about the requesting client system and a requested view mode, wherein the view mode includes one of a full-screen mode, a sub-full-screen mode, a portrait mode, or a landscape mode;
determining, for the requesting client system, a first encoding based on the overall quality score of the encoding and the information associated with the request;
sending, to the requesting client system, the first encoding for display;
receiving, from the requesting client system, view-time information that the requesting client system has switched the view mode;
updating the overall quality score for one or more encodings for the video based on the view-time information;
determining, based on the view-time information and the updated overall quality score, a second encoding;
sending, to the requesting client system, the second encoding for display,
accessing view-time information for determining a quality of playback of the first encoding or the second encoding;
determining, based on the view-time information, a third encoding; and
sending, to the requesting client system, the third encoding, wherein the view-time information includes information about a download rate associated with the requesting client system, wherein the download rate is a measure of a rate at which the first encoding is being downloaded by the requesting client system.

2. The method of claim 1, wherein the information associated with the request further comprises information about a network bandwidth available to the requesting client system.

3. The method of claim 1, wherein the view-time information that the requesting client system has switched the view mode includes one of a switch from a sub-full-screen mode to a full-screen mode or a switch from a full-screen mode to a sub-full-screen mode.

4. The method of claim 1, wherein the view-time information that the requesting client system has switched the view mode includes one of a switch from a portrait mode to a landscape mode or a switch from a landscape mode to a portrait mode.

5. The method of claim 1, wherein the playback-quality score is further based on a comparison of the video quality or bit rate of the respective encoding to a video quality or bit rate of the video as received from the uploading client system.

6. The method of claim 1, wherein the upload-quality score is further based on a content type of the video.

7. The method of claim 6, wherein the content type comprises: a slide show, an animation, or a natural video.

8. One or more computer-readable non-transitory storage media embodying software that is operable when executed to:
receive, from an uploading client system, a video;
calculate an overall quality score for one or more encodings for the video, wherein the overall quality score of a respective encoding is based on a playback-quality score and an upload quality score, the playback-quality score being based on a video quality or bit rate of the respective encoding and the upload-quality score being a quality measurement of the video as received;
calculate the upload-quality score based on one or more parameters associated with the video as received from the uploading client system, wherein the one or more parameters comprises a bit rate or a resolution of the video;
receive, from a requesting client system, a request for the video and information associated with the request, wherein the information associated with the request comprises information about the requesting client system and a requested view mode, wherein the view mode includes one of a full-screen mode, a sub-full-screen mode, a portrait mode, or a landscape mode;

determine, for the requesting client system, a first encoding based on the overall quality score of the encoding and the information associated with the request;
send, to the requesting client system, the first encoding for display;
receive, from the requesting client system, view-time information that the requesting client system has switched the view mode;
update the overall quality score for one or more encodings for the video based on the view-time information;
determine, based on the view-time information and the updated overall quality score, a second encoding;
send, to the requesting client system, the second encoding for display;
access view-time information for determining a quality of playback of the first encoding or the second encoding;
determine, based on the view-time information, a third encoding; and
send, to the requesting client system, the third encoding, wherein the view-time information includes information about a download rate associated with the requesting client system, wherein the download rate is a measure of a rate at which the first encoding is being downloaded by the requesting client system.

9. The media of claim 8, wherein the information associated with the request further comprises information about a network bandwidth available to the requesting client system.

10. The media of claim 8, wherein the upload-quality score is further based on a content type of the video.

11. The media of claim 10, wherein the content type comprises: a slide show, an animation, or a natural video.

12. The media of claim 8, wherein the view-time information that the requesting client system has switched the view mode includes one of a switch from a sub-full-screen mode to a full-screen mode or a switch from a full-screen mode to a sub-full-screen mode.

13. The media of claim 8, wherein the view-time information that the requesting client system has switched the view mode includes one of a switch from a portrait mode to a landscape mode or a switch from a landscape mode to a portrait mode.

14. The media of claim 8, wherein the playback-quality score is further based on a comparison of the video quality or bit rate of the respective encoding to a video quality or bit rate of the video as received from the uploading client system.

15. A system comprising: one or more processors; and one or more computer-readable non-transitory storage media coupled to one or more of the processors and comprising instructions operable when executed by one or more of the processors to cause the system to:
receive, from an uploading client system, a video;
calculate an overall quality score for one or more encodings for the video, wherein the overall quality score of a respective encoding is based on a playback-quality score and an upload quality score, the playback-quality score being based on a video quality or bit rate of the respective encoding and the upload-quality score being a quality measurement of the video as received;
calculate the upload-quality score based on one or more parameters associated with the video as received from the uploading client system, wherein the one or more parameters comprises a bit rate or a resolution of the video;
receive, from a requesting client system, a request for the video and information associated with the request, wherein the information associated with the request comprises information about the requesting client system and a requested view mode, wherein the view mode includes one of a full-screen mode, a sub-full-screen mode, a portrait mode, or a landscape mode;
determine, for the requesting client system, a first encoding based on the overall quality score of the encoding and the information associated with the request;
send, to the requesting client system, the first encoding for display;
receive, from the requesting client system, view-time information that the requesting client system has switched the view mode;
update the overall quality score for one or more encodings for the video based on the view-time information;
determine, based on the view-time information and the updated overall quality score, a second encoding;
send, to the requesting client system, the second encoding for display;
access view-time information for determining a quality of playback of the first encoding or the second encoding;
determine, based on the view-time information, a third encoding; and
send, to the requesting client system, the third encoding, wherein the view-time information includes information about a download rate associated with the requesting client system, wherein the download rate is a measure of a rate at which the first encoding is being downloaded by the requesting client system.

16. The system of claim 15, wherein the information associated with the request further comprises information about a network bandwidth available to the requesting client system.

17. The system of claim 15, wherein the view-time information that the requesting client system has switched the view mode includes one of a switch from a sub-full-screen mode to a full-screen mode or a switch from a full-screen mode to a sub-full-screen mode.

18. The system of claim 15, wherein the view-time information that the requesting client system has switched the view mode includes one of a switch from a portrait mode to a landscape mode or a switch from a landscape mode to a portrait mode.

19. The system of claim 15, wherein the playback-quality score is further based on a comparison of the video quality or bit rate of the respective encoding to a video quality or bit rate of the video as received from the uploading client system.

20. The system of claim 15, wherein the upload-quality score is further based on a content type of the video, and wherein the content type comprises: a slide show, an animation, or a natural video.

* * * * *